United States Patent [19]
DeRees

[11] Patent Number: 5,915,781
[45] Date of Patent: Jun. 29, 1999

[54] VEHICLE BODY ASSEMBLY

[75] Inventor: Delbert D. DeRees, Romeo, Mich.

[73] Assignee: Chrysler Corporation, Auburn Hill, Mich.

[21] Appl. No.: 08/642,369

[22] Filed: May 3, 1996

Related U.S. Application Data

[62] Division of application No. 08/326,908, Oct. 21, 1994.

[51] Int. Cl.⁶ .................................................. B60R 27/00
[52] U.S. Cl. .............................................. 296/203; 296/29
[58] Field of Search ............................... 296/203, 29, 901

[56] References Cited

U.S. PATENT DOCUMENTS

| | | | |
|---|---|---|---|
| 1,155,717 | 10/1915 | Fouts ........................................... | 296/29 |
| 3,540,314 | 11/1970 | Howard ..................................... | 264/261 |
| 3,596,979 | 8/1971 | Hablitzel et al. ......................... | 296/901 |
| 3,759,180 | 9/1973 | Gibbons et al. .......................... | 101/405 |
| 3,853,495 | 12/1974 | Shire ......................................... | 264/261 |
| 3,896,199 | 7/1975 | Michaelis ................................. | 264/261 |
| 3,904,731 | 9/1975 | Orkin et al. .............................. | 264/261 |
| 3,962,399 | 6/1976 | Shepherd, Jr. et al. ................. | 264/261 |
| 3,970,401 | 7/1976 | Lubeck .................................... | 264/261 |
| 4,183,778 | 1/1980 | Mesnel .................................... | 264/261 |
| 4,304,038 | 12/1981 | Yabu et al. ............................... | 29/458 |
| 4,435,240 | 3/1984 | Knaus et al. ............................ | 156/242 |
| 4,444,809 | 4/1984 | Rau ......................................... | 427/163 |
| 4,834,931 | 5/1989 | Weaver .................................... | 264/261 |
| 4,942,013 | 7/1990 | Palmer et al. ........................... | 264/511 |
| 5,209,541 | 5/1993 | Janotik .................................... | 296/29 |
| 5,273,606 | 12/1993 | Greve et al. ............................ | 156/216 |
| 5,320,403 | 6/1994 | Kazyak ................................... | 296/29 |
| 5,362,120 | 11/1994 | Cornille ................................... | 296/29 |

FOREIGN PATENT DOCUMENTS

| | | | |
|---|---|---|---|
| 317109 | 5/1989 | European Pat. Off. ............... | 296/901 |
| 3811427 | 10/1989 | Germany ................................ | 296/901 |
| 8704679 | 8/1987 | WIPO ...................................... | 296/203 |

*Primary Examiner*—Gary C. Hoge
*Attorney, Agent, or Firm*—Thomas G. Pasternak

[57] ABSTRACT

An assembly of vehicle body members by injecting an adhesive into a predesigned channel cavity formed at the joint interface of the vehicle body members.

8 Claims, 3 Drawing Sheets

VEHICLE BODY ASSEMBLY

CROSS-REFERENCE TO RELATED APPLICATION

This application is a division of pending application Ser. No. 08/326,908, titled "Vehicle Assembly Method" filed Oct. 21, 1994 by the same inventors as in the present application.

FIELD OF THE INVENTION

The present invention generally relates to a vehicle body assembly and more particularly, relates to vehicle body members assembled by injecting an adhesive into a predesigned channel cavity formed at the joint interface of two vehicle body members.

BACKGROUND OF THE INVENTION

Automobile body panels and frame members are assembled together by various assembly methods. For instance, conventional sheet metal body members are welded together by spot welds or fastened together by mechanical means. In recent years, polymeric based composite vehicle body members are widely used. Adhesives have been found useful in the assembly of plastic body members. Such applications include the bonding of a body panel to a frame member, i.e. the bonding of an appearance panel to a support structure such as in the application of a vehicle hood, or a variety of other body components. However, most of the adhesive bonded parts are used in non-structural applications.

To qualify as a bonding method for automobile body components, various performance requirements must be met by the adhesive bonded assembly. Such requirements include, for instance, an exposure test of automobile service environment for low temperature/high temperature, salt spray, vibrations, weatherability, etc. In the case of a structural component, the additional requirements for the component to carry a dynamic: load and to survive various stress and fatigue conditions must also be met. Due to the difficulty of meeting all these requirements, the adhesive bonding technique has not been widely used in the assembly of automobile structural components.

It is therefore an object of the present invention to provide structural components of a vehicle bonded by adhesives that does not have the shortcomings of the prior art methods.

It is another object of the present invention to provide vehicle structural components bonded by adhesives where the components can be assembled together in a dry state without contamination by squeezed-out adhesives.

It is a further object of the present invention to provide vehicle structural components adhesively bonded together in such a way that the vehicle components may be disassembled before the application of the adhesive.

It is yet another object of the present invention to provide vehicle structural components which can be adhesively bonded together which can be carried out efficiently in, an automobile assembly line environment.

SUMMARY OF THE INVENTION

In accordance with the present invention, a method of adhesively bonding vehicle structural components together neatly without the need of cleaning up messy adhesives can be carried out.

In the preferred embodiment, a special V-shaped tongue-and-groove channel cavity is provided at the interface of the two vehicle structural components to accept the adhesive. The tongue-and-groove channel is designed such that the shoulders of the tongue and the shoulders of the groove have an interference area so as to provide a fluid-tight seal of the channel cavity formed between the tongue and the groove from the outside environment. An adhesive is injected through an injection gate to fill the cavity formed between the tongue and the groove until the adhesive reaches the end of the cavity which is vented. The viscosity of the adhesive and the pressure drop of the adhesive flow can be predetermined so as to provide a suitable fill time for the cavity.

In an alternate embodiment, a vacuum or a negative pressure is first pulled from the vent hole situated at the end of the cavity such that the intimate mating of the two frame members can be enhanced and further, the flow rate of the adhesive can be improved.

In other alternate embodiments, the cross-sectional areas of the channel cavity between the two frame members to be bonded together are constructed in other than tongue-and-groove configurations. For instance, a right-angle joint provides the benefit of high shear and high tensile strength regardless from which direction the joint is loaded. In another tongue-and-groove arrangement, the shoulder areas of the tongue and the groove are not interfering with each other, instead, a seal made of a suitable sealing material is used to contain the adhesive under pressure inside the cavity.

BRIEF DESCRIPTION OF THE DRAWINGS

Other objects, features and advantages of the present invention will become apparent upon consideration of the specification and the appended drawings, in which.

DETAILED DESCRIPTION OF THE PREFERRED EMBODIMENT

The present invention provides an assembly of vehicle body components adhesively bonded together by providing a special joint having a channel cavity for the injection and flow of adhesives at the interface between the two body members.

Assemblies according to the present invention may include bonded polymeric composite components of a vehicle body. The polymeric composite components for a vehicle body are used frequently to achieve the goal of maximum parts consolidation and cost savings. The present invention can also include vehicle body components that are made of conventional sheet metal materials. An adhesive of a specific chemistry may be selected for each application as long as the adhesive provides adequate bond strength to the surfaces joined together.

The present invention may utilize a low pressure injection apparatus for injecting an adhesive through an injecting port into a channel cavity formed in the joint interface. The injection process is stopped after the channel cavity is completely filled, i.e. when the adhesive reaches the end of the cavity by popping out an indicator. Prior to the injection of the adhesive, the body components may be held together by mechanical devices such as bolts so that the injection process of the adhesive can be easily carried out.

The adhesive bonding method provides several advantages. First, the vehicle body components are put together initially in a dry state, i.e., prior to the injection of the adhesive, and therefore there is no adhesive squeeze-out problem and messy adhesive to clean up. This is important in a manufacturing environment where valuable production time is frequently lost in the clean up of excess adhesives. Secondly, the adhesive bonding method affords the capability of disassembling the vehicle body components before the adhesive is applied. This reduces the number of scrap parts due to misalignment of the assembly or other assembly defects. Thirdly, in the process, an adhesive is applied by a low pressure injection device and flows continuously until a pop-out indicator is ejected at the end of the channel cavity (i.e., at the vent hole). The injection pressure is then immediately stopped so that there is no excess adhesive to be cleaned up and furthermore, there is no waste of adhesive materials.

Figure 1A:
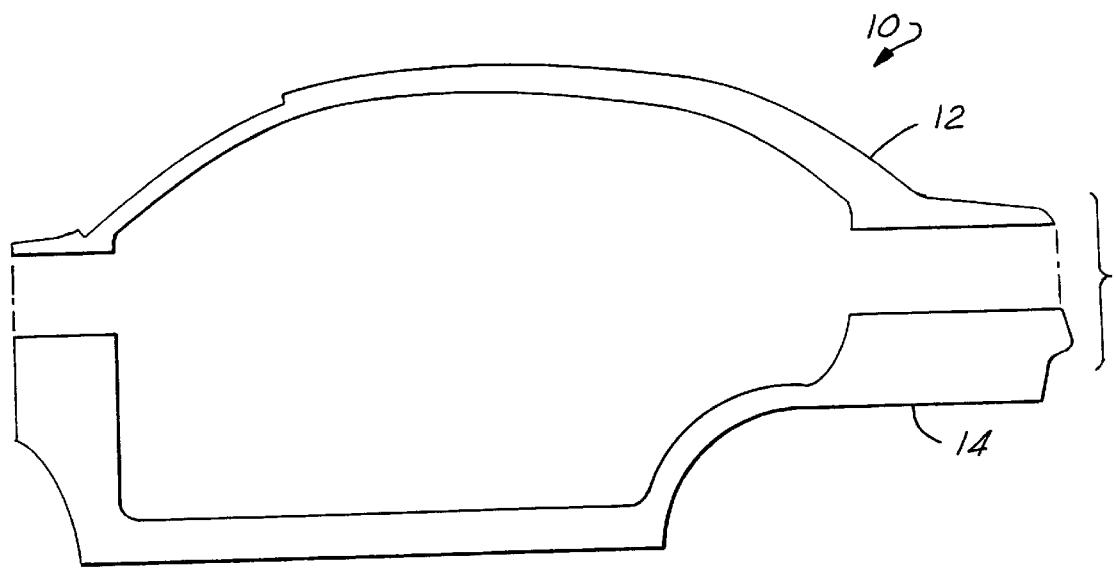
FIG. 1A is the front view of a typical vehicle upper and lower body shells that are suitable for the present invention bonding technique.
Figure 1B:
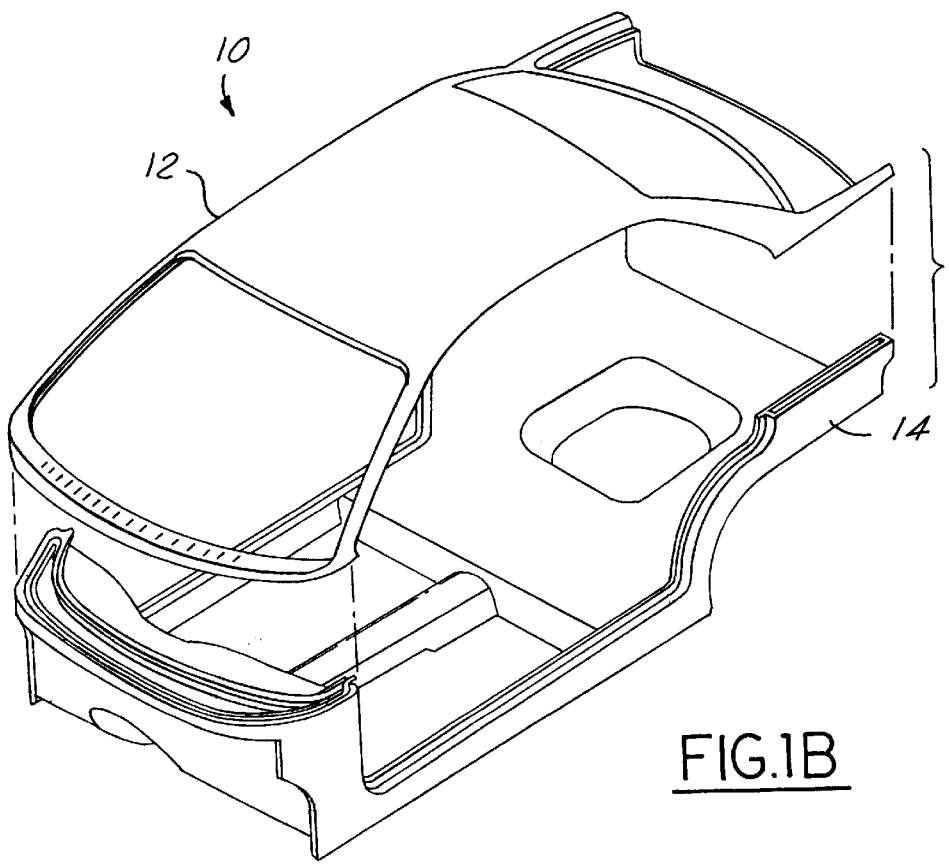
FIG. 1B is a perspective view of the vehicle upper and lower shells shown in FIG. 1A.

Referring now to FIG. 1A, a modular design vehicle body 10 according to the present invention bonding is shown with an upper body shell 12 and a lower body shell 14 to be bonded together. This is a typical composite vehicle body shell that is being considered by the automotive industry for ease of manufacturing and assembly. It is sometimes referred to as a "shoe box" construction of a vehicle body. FIG. 1B shows a perspective view of FIG. 1A.

Figure 2A:
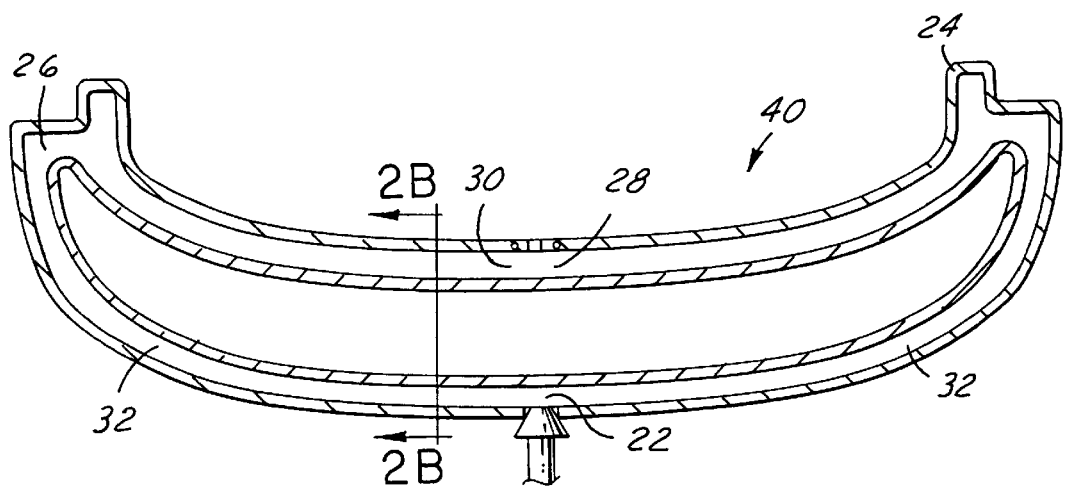
FIG. 2A is the top view of a vehicle dash structure.
Figure 2B:
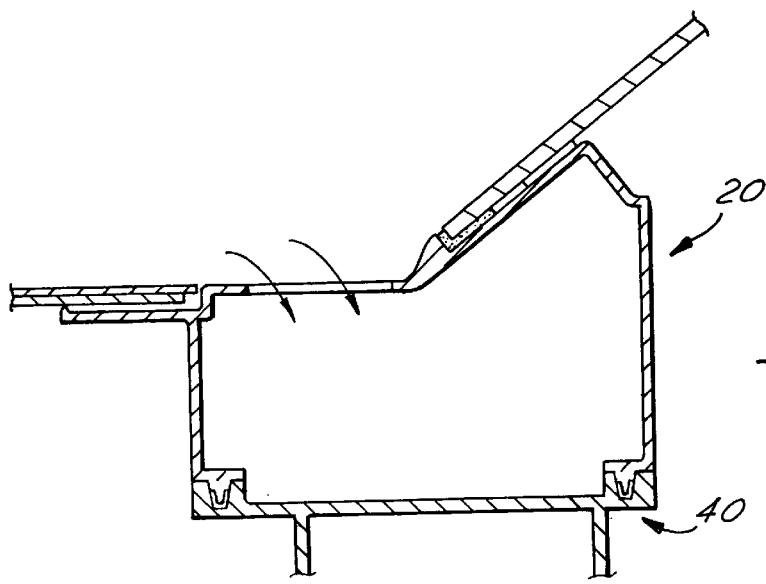
FIG. 2B is a sectional view taken along line BB, of FIG. 2A.
Figure 2C:
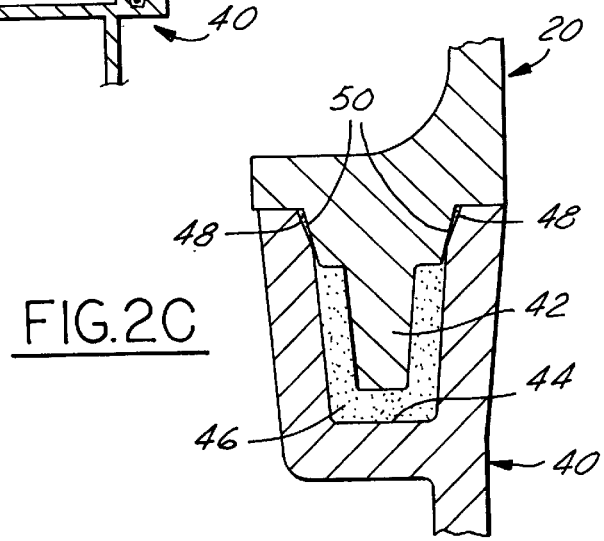
FIG. 2C is an enlarged view of the tongue-and-groove channel cavity between the upper body shell and the lower body shell shown in FIG. 2B.

FIG. 2A is the top view of a dash structure 40 used in a vehicle. An injection port 22 is provided at the center of the dash so that an equal amount of adhesive flow can be directed to both directions to first reach the ends 24 and 26 and then reach vent holes 28 and 30. When the vent holes 28 and 30 are reached by the adhesive flow, the complete channel cavity 32 is filled. A cross-sectional view taken along line BB in FIG. 2A is shown in FIG. 2B. Also shown in 2B is a plenum structure 20 which mates with the dash structure 40. A detailed enlarged cross-sectional view of the joint between plenum 20 and dash 40 is shown in FIG. 2C. It is seen that a tongue-and-groove joint is provided between the upper plenum structure 20 and the lower dash structure 40. The tongue 42 and the groove 44 fit together forming a channel cavity 46 for the adhesive flow. The shoulder 48 of tongue 42 on the plenum structure 20 is designed such that it provides a 0.5 mm interference with the shoulder 50 of the groove 44 located on the dash structure 40. This interference provides a fluid tight seal for the channel cavity 46 during the time when adhesive is pumped into the channel and filling the channel cavity under low injection pressure. Other sealing methods can also be used to produce the same desirable result.

Figure 3A:
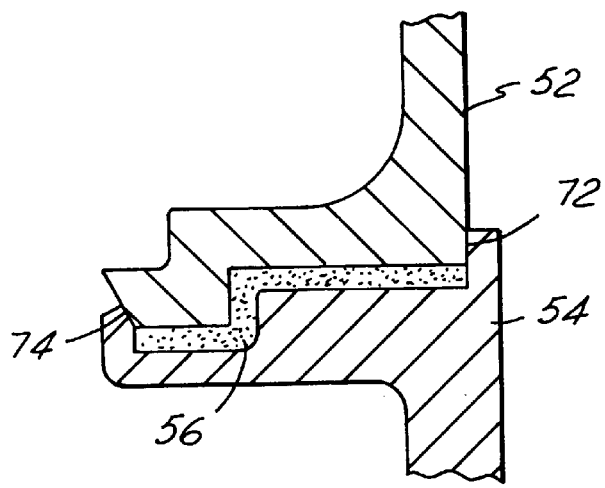
FIG. 3A is an enlarged cross-sectional view of a right-angle joint.

It should be noted that joint constructions other than tongue-and-groove can also be used in the present invention. One of such joint constructions is shown in FIG. 3A as a right-angle joint. An upper frame member 52 and a lower frame member 54 are joined together at the shoulder portions 72 and 74 of the lower frame member 54 forming a channel cavity 56. The benefit of such a right-angle joint is that it combines the desirable shear and tensile properties together such that no matter from which direction force is applied to the joint, the joint exhibits a maximum strength.

Figure 3B:
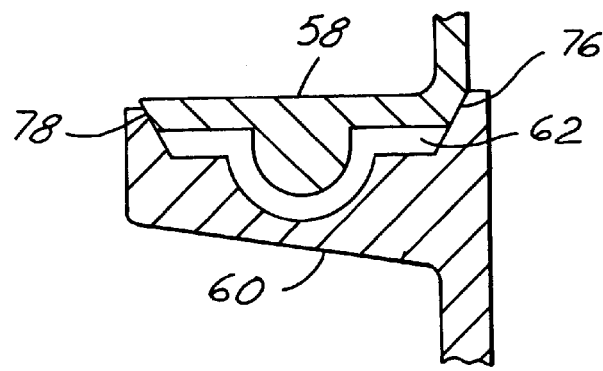
FIG. 3B is an enlarged cross-sectional view of a variation of the tongue-and-groove joint.
Figure 3C:
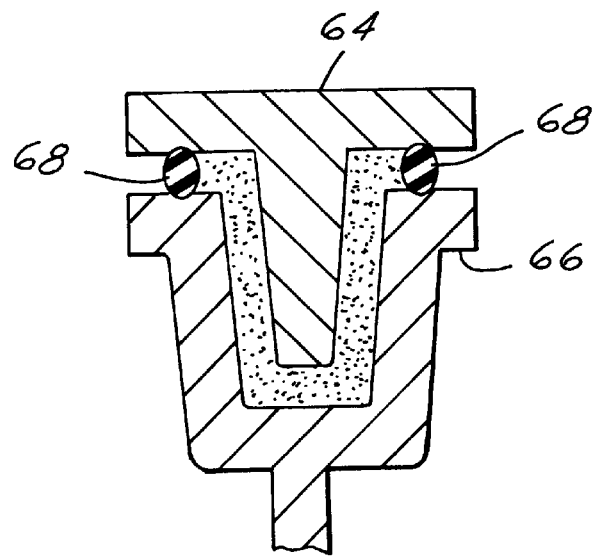
FIG. 3C is an enlarged cross-sectional view of another variation of the tongue-and-groove joint.

Another variation of a tongue-and-groove joint is shown in FIG. 3B. An upper frame member 58 and a lower frame member 60 are joined together at the shoulder portions of 76 and 78 of the lower frame member 60 forming a channel cavity 62 for filling of an adhesive. This tongue-and-groove arrangement also provides a maximum surface area for improved bond strength. FIG. 3C shows yet another variation of the tongue-and-groove joint construction wherein the shoulders of the upper body member 64 and the lower body member 66 are not in contact. In order to pull vacuum in the flow channel and to prevent leaking of the adhesive from the channel cavity, seals 68 made of a suitable sealing material are used between the mating surfaces of the upper member 64 and the lower member 66. A suitable material for the seal is buytl rubber which is frequently used in the sealing of automobile bodies members 64 and 66 may be further joined via bolts 71 with nuts 73 if desired.

The volumetric flow rate of an adhesive through a channel cavity can be calculated by the following equation.

$$Q = \frac{2}{3} \frac{WP(B^3)W}{/L}$$

wherein Q is the volumetric flow rate, /P is the pressure drop, B is the slit half thickness, L is the slit length, W is the slit width, and / is the fluid viscosity. Since the thickness of the slit is defined as 2B, when a channel is 2 mm thick, B is equal to 1 mm. In a typical example, a channel width of 26.2 mm, a B value of 1 mm, and a channel length of 2 m are used. Assuming that a desirable fill time for the channel cavity is 1 min., using the channel dimensions indicated along with the 1 min. fill time, a volumetric flow rate of approximately 1,750 mm$^3$/sec is needed to fill the channel cavity shown in the example. The relationship between the pressure drop required to pump the adhesive through the channel cavity and the viscosity of the adhesive can therefore be predicted.

A typical adhesive that can be used is a two-part polyurethane adhesive, such as that supplied by the Ashland Chemical Company under the tradename of Pliogrip®. Typical viscosities for this adhesive is between 16 and 18 Pa•sec. An adhesive having a viscosity in this range requires a pressure drop of approximately 500 psi to fill a channel cavity of 2 mm thick.

It was discovered that flowability and pumpability are major criteria to be satisfied for a satisfactory adhesive application. For an adhesive having a low viscosity, i.e., in the range of 1–2 Pa•sec., an inlet pressure between 30 and 60 psi to fill the desired channel within 1 min. time is required. When the thickness of the channel is doubled from 2 mm to 4 mm, the channel volume also doubles and therefore requires the doubling of the pumping rate. It is advantageous to use a thicker channel in order to minimize the pressure drop required for pumping the adhesive. The pressure drop required to pump a prepolymer at various flow rates can be measured by using a pressure gage. The prepolymer can then be tested on a cone-and-plate rheometer to determine its viscosity.

It was discovered that an ideal length of the tongue in a tongue-and-groove joint construction shown in FIG. 2C is approximately 15 mm. This affords a larger surface area for the adhesive to be bonded to the body members and allows greater load transfer capability between the upper and the lower body shells.

It has been observed that the failure mode of a joint having sufficient length of the tongue is a tensile failure in the body member itself as opposed to a shear failure in the adhesive bonded joint.

While the present invention has been described in an illustrative manner, it should be understood that the terminology used is intended to be in a nature of words of description rather than of limitation.

Furthermore, while the present invention has been described in terms of several preferred embodiments thereof, it is to be appreciated that those skilled in the art will readily apply these teachings to other possible variations of the invention. For instance, any one-part or two-part adhesive materials other than the polyurethane adhesive, i.e., epoxy, vinyl ester, etc. can also be suitably used to achieve the same desirable results of the present invention.

The embodiments of the invention in which an exclusive property or privilege is claimed are defined as follows:

What is claimed is:

1. A vehicle body assembly bonded together by an adhesive comprising:
    a first vehicle body part having a first surface comprising a protruded area,
    a second vehicle body part having a second surface comprising an indented area,
    a channel cavity formed by said protruded area in said, first surface and said indented area in said second surface, said cavity being filled with an adhesive bonding said two vehicle body parts together.

2. A vehicle body assembly according to claim 1, wherein said channel cavity having the shape of a tongue-and-groove.

3. A vehicle body assembly adhesively bonded together by a method comprising the steps of:

providing a first vehicle body part having a first surface to be bonded to a second vehicle body part, said first surface having a protruded area,
    providing a second vehicle body part having a second surface to be bonded to said first vehicle body part, said second surface having an indented area positioned corresponding to the position of said protruded area on said first surface,
    positioning said first and said second vehicle body parts together in a bonded position such that a channel cavity is formed by said protruded area on said first surface and said indented area on said second surface, and
    injecting an adhesive into said channel cavity while said first and second vehicle body parts are positioned together in said bonded position and forming an adhesive bond between said first and said second vehicle body parts.

4. A vehicle body assembly according to claim 3, wherein said channel cavity has the configuration of a tongue-and-groove shape formed by a tongue in said protruded area in said first surface and a groove in said indented area in said second surface.

5. A vehicle body assembly according to claim 3, wherein said positioning step further comprises fastening said first and said second vehicle body parts together by mechanical means.

6. A vehicle body assembly according to claim 5, wherein said mechanical means comprises bolts.

7. A vehicle body assembly according to claim 3, wherein said adhesive is injected into said channel cavity through an injection port in fluid communication with said channel cavity.

8. A vehicle body assembly according to claim 3, wherein said channel cavity connects with at least one aperture in fluid communication with the outside environment at a location farthest away from said injection port.

* * * * *